(12) United States Patent
Yonezawa (10) Patent No.: US 9,997,803 B2
(45) Date of Patent: Jun. 12, 2018

(54) ELECTROLYTE AND BATTERY USING THE SAME

(75) Inventor: Kei Yonezawa, Tokyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 9 days.

(21) Appl. No.: 10/891,673

(22) Filed: Jul. 15, 2004

(65) Prior Publication Data

US 2005/0048374 A1 Mar. 3, 2005

(30) Foreign Application Priority Data

Jul. 18, 2003 (JP) .................................. 2003-276739

(51) Int. Cl.
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2300/0025* (2013.01); *H01M 2300/0094* (2013.01)

(58) Field of Classification Search
CPC ......... H01M 10/0565; H01M 10/0525; H01M 2300/0094; H01M 2300/0025; Y02E 60/122

See application file for complete search history.

(56) References Cited

U.S. PATENT DOCUMENTS

| | | | | |
|---|---|---|---|---|
| 5,670,273 | A * | 9/1997 | Velasquez et al. | 429/162 |
| 6,235,433 | B1 * | 5/2001 | Amano et al. | 429/303 |
| 6,506,523 | B1 * | 1/2003 | Hatazawa et al. | 429/316 |
| 2003/0148189 | A1 * | 8/2003 | Yamaki et al. | 429/324 |

FOREIGN PATENT DOCUMENTS

| | | |
|---|---|---|
| JP | 62-048716 | 3/1987 |
| JP | 62-285954 | 12/1987 |
| JP | 11-312536 | 11/1999 |
| JP | 2001-015163 | 1/2001 |
| JP | 2003-017128 | 1/2003 |

OTHER PUBLICATIONS

Sperling, L.H., Introduction to Physical Polymer Science, Wiley-Interscience, 2001, 3rd ed., p. 6.*
Machine translation of JP 2001-015163, retrieved from <http://www19.ipdl.inpit.go.jp/PA1/cgi-bin/PA1DETAIL> on Dec. 13, 2012.*

* cited by examiner

*Primary Examiner* — Cynthia K Walls
(74) *Attorney, Agent, or Firm* — K&L Gates LLP (57) ABSTRACT

Provided are an electrolyte having superior adhesion strength to an electrode and superior permeability into the electrode, and a battery using the electrolyte. An electrolyte comprises, for example, a high molecular weight compound and an electrolyte solution prepared by dissolving an electrolyte salt in a solvent, and the electrolyte is formed through applying a coating solution prepared by dissolving the high molecular weight compound in a mixed solvent to at least either a cathode or an anode. The high molecular weight compound includes a first high molecular weight compound with a weight-average molecular weight of 550,000 or more and a second high molecular weight compound with a weight-average molecular weight of 1,000 or more but not exceeding 300,000. Thereby, the adhesion strength of the electrolyte to the electrode, the permeability of the electrolyte into the electrode and the mechanical strength of the electrolyte can be improved, and the capability of holding a solvent can be improved.

11 Claims, 3 Drawing Sheets

ELECTROLYTE AND BATTERY USING THE SAME

BACKGROUND OF THE INVENTION

1. Field of the Invention

The present invention relates to an electrolyte comprising a high molecular weight compound and a battery using the electrolyte.

2. Description of the Related Art

In recent years, a large number of portable electronic devices such as camera/VTR (video tape recorder) combination systems, cellular phones or portable computers have been introduced, and a reduction in size and weight of the devices has been required. Moreover, in order to be able to carry the portable electronic devices for a longer time, the volume energy density of the portable electronic devices has been improved so as to increase the capacity thereof Accordingly, as portable power sources for the devices, research and development of batteries, specifically lithium-ion secondary batteries which have a thinner profile or can be folded have been actively promoted. As an electrolyte of such a battery with a high degree of flexibility in shape, for example, a gel electrolyte in which a high molecular weight compound holds an electrolyte solution, or a solid-high molecular weight electrolyte in which an electrolyte salt is dispersed in a high molecular weight compound is cited, and research on them has been actively conducted.

As the high molecular weight compound used in the solid high molecular weight electrolyte, silicon gel, acryl gel, acrylonitrile gel, a modified polyphosphazene polymer, polyethylene oxide, polypropylene oxide, a conjugated polymer thereof, a cross-linked polymer thereof, a modified polymer and the like have been reported. However, these high molecular weight compounds have insufficient film strength and poor adhesion to an electrode. The adhesion between the electrolyte and the electrode has a large influence on battery performance. For example, when the adhesion between them is poor, contact resistance between the electrolyte and the electrode increases, thereby the internal resistance in a battery increases. Moreover, it is difficult to transfer ions between the electrolyte and the electrode in an ideal state, so the battery capacity is reduced. In addition, when the battery is used in this state for a long time, a charge/discharge current becomes nonuniform, and a lithium dendrite is easily deposited. As a result, the charge/discharge cycle life is reduced. Therefore, a critical problem that the battery does not meet a fundamental and important requirement for commercialization, that is, "the battery can be stably used for a long time" arises. Therefore, it is extremely important to bond the solid high molecular weight electrolyte or a gel electrolyte to the electrode with sufficient adhesion strength.

In order to overcome such a problem, a method of cross-linking by a reaction between trifunctional polyethylene glycol and a diisocyanate derivative (refer to Japanese Unexamined Patent Application Publication No. Sho 62-48716), and a method of cross-linking by a polymerization reaction of polyethylene glycol diacrylate (refer to Japanese Unexamined Patent Application Publication No. Sho 62-285954) have been attempted. Moreover, a technique of using a fluorine-based polymer with high molecular weight as a high molecular weight compound has been proposed (refer to Japanese Unexamined Patent Application Publication No. Hei 11-312536).

However, in the methods described in Japanese Unexamined Patent Application Publication Nos. Sho 62-48716 and Sho 62-285954, even if the film strength can be improved, an unreacted substance or a solvent used for a reaction remains, thereby it is difficult to sufficiently secure adhesion to the electrode. Moreover, a drying step for removing the solvent is absolutely necessary, thereby productivity is low. Therefore, a further improvement is required. An electrolyte described in Japanese Unexamined Patent Application Publication No. Hei 11-312536 has high viscosity, so in terms of obtaining higher capacity, when the thickness of an active material layer increases to improve efficiency of filling an active material into a battery, the electrolyte less easily permeates into the neighborhood of a current collector, so it is difficult that the electrolyte comes into contact with the active material layer in the neighborhood of the current collector in an ideal state. As a result, internal resistance increases, thereby cycle characteristics, load characteristics and low temperature characteristics decline.

Therefore, by recent and rapid development in portable electronic devices, the transmission speed or the processing speed of the devices has been improved, or the devices have become multifunctional, thereby batteries are required to be used at high load current. However, these techniques become incapable of coping with the requirements under present circumstances.

SUMMARY OF THE INVENTION

In view of the foregoing, it is an object of the invention to provide an electrolyte with superior adhesion strength to an electrode and superior permeability into the electrode, and a battery using the electrolyte.

An electrolyte according to the invention comprises: a first high molecular weight compound with a weight-average molecular weight of 550,000 or more; and a second high molecular weight compound with a weight-average molecular weight of 1,000 or more but not exceeding 300,000.

A battery according to the invention comprises: a cathode; an anode; and an electrolyte, wherein the electrolyte comprises a first high molecular weight compound with a weight-average molecular weight of 550,000 or more; and a second high molecular weight compound with a weight-average molecular weight of 1,000 or more but not exceeding 300,000.

The electrolyte according to the invention comprises the first high molecular weight compound and the second high molecular weight compound, so the adhesion of the electrolyte to an electrode, the permeability of the electrolyte into the electrode, the strength of the electrolyte and the capability of holding a solvent are superior.

In the battery according to the invention, the electrolyte according to the invention is used, so superior charge-discharge cycle characteristics, superior load characteristics and superior low temperature characteristics can be achieved.

In the electrolyte according to the invention, the first high molecular weight compound and the second high molecular weight compound are included, so the adhesion strength to the electrode and the permeability into the electrode can be improved, and the electrolyte can come into contact with the electrode in an electrically good condition. Moreover, the mechanical strength can be improved, and the solvent can be sufficiently held.

Further, in the battery according to the invention, the electrolyte according to the invention is used, so superior charge-discharge cycle characteristics, superior load characteristics and superior low temperature characteristics can be obtained.

Specifically, when a third high molecular weight compound is included in addition to the first high molecular weight compound and the second high molecular weight compound, manufacturing can be easily performed without a decline in characteristics.

Other and further objects, features and advantages of the invention will appear more fully from the following description.

DETAILED DESCRIPTION OF THE PREFERRED EMBODIMENTS

Preferred embodiments of the invention will be described in more detail below referring to the accompanying drawings.

[First Embodiment]

Figure 1:
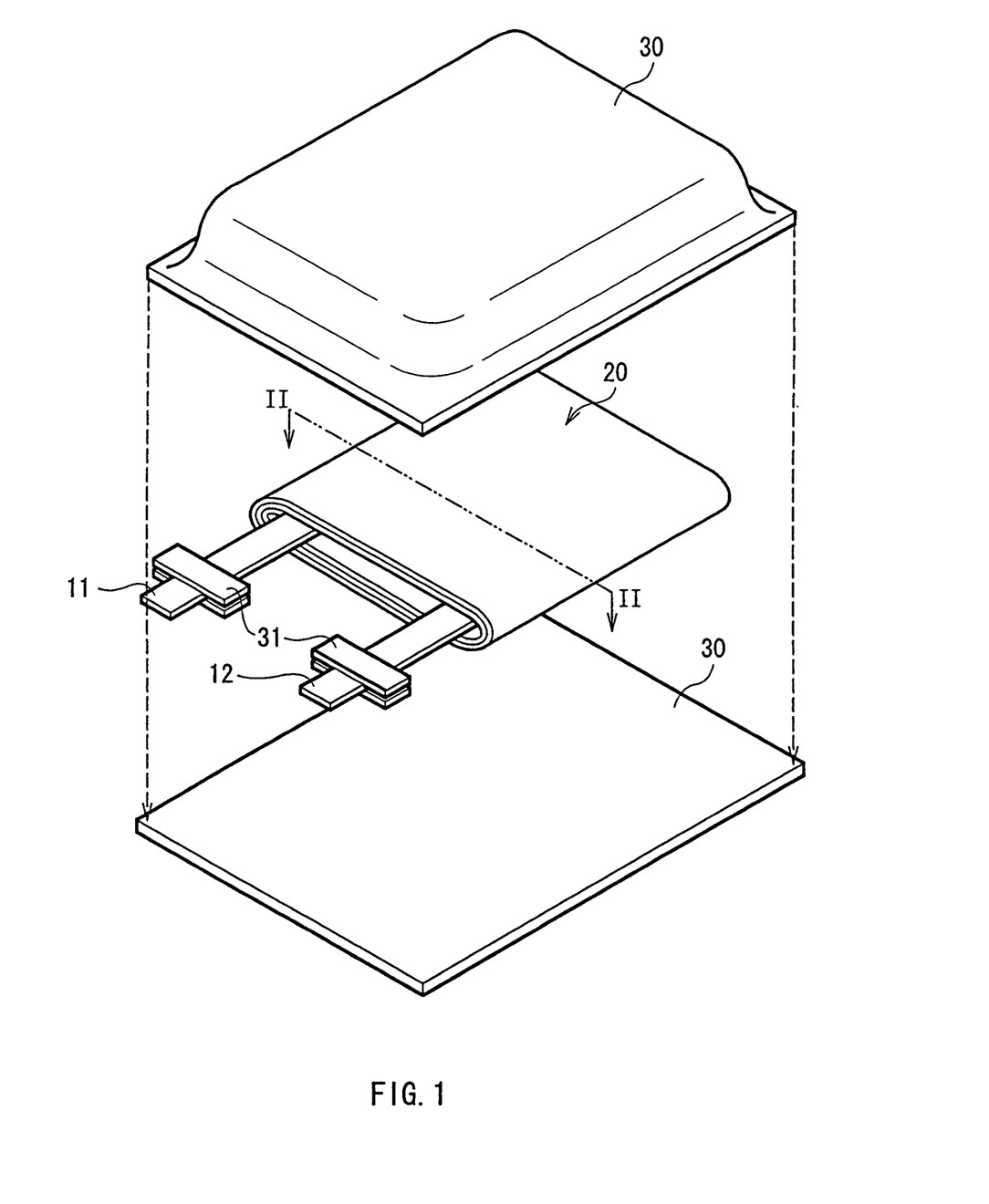
FIG. 1 is an exploded perspective view of a secondary battery according to an embodiment of the invention.

FIG. 1 shows an exploded view of a secondary battery according to a first embodiment of the invention. The secondary battery comprises a battery element 20 with a cathode lead 11 and anode lead 12 attached thereto which is contained in a film-shaped package member 30.

The cathode lead 11 and the anode lead 12 are drawn from the inside of the package member 30 to the outside, for example, in the same direction. The cathode lead 11 and the anode lead 12 are formed of, for example, a metal material such as aluminum (Al), copper (Cu), nickel (Ni) or stainless in a thin plate shape or a mesh shape.

The package member 30 is, for example, a rectangular laminate film in which a nylon film, aluminum foil and a polyethylene film are laminated in order, and edge portions of the package member 30 are bonded together by fusion bonding or an adhesive. An adhesive film 31 is inserted each between the package member 30 and the cathode lead 11 and between the package member 30 and the anode lead 12 so as to prevent the entry of outside air. The adhesive film 31 may be made of a material with adhesion to the cathode lead 11 and the anode lead 12, and is made of, for example, a polyolefin resin such as polyethylene, polypropylene, modified polyethylene, modified polypropylene or a copolymer thereof.

In addition, the package member 30 may be made of a laminate film with any other structure, a high molecular weight film such as polypropylene, or a metal film instead of the above-described laminate film.

Figure 2:
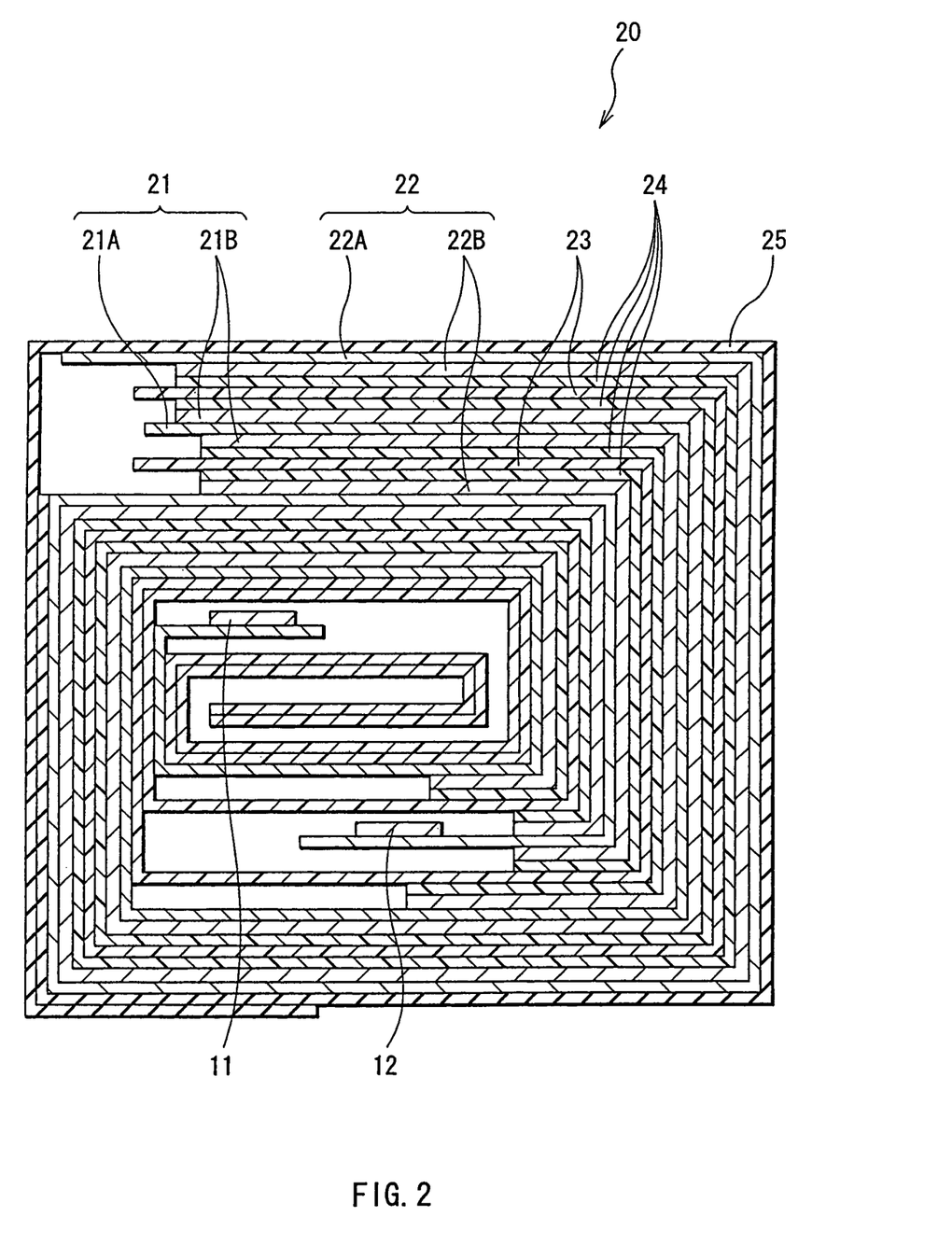
FIG. 2 is a sectional view of a battery element taken along a line II-II of FIG. 1.

FIG. 2 shows a sectional view of the battery element 20 taken along a line II-II of FIG. 1. The battery element 20 is a spirally wound laminate including a cathode 21 and an anode 22 with a separator 23 and an electrolyte 24 in between, and an outermost portion of the battery element 20 is protected with a protective tape 25.

The cathode 21 includes a cathode current collector 21A having a pair of facing surfaces and a cathode active material layer 21B disposed on one side or both sides of the cathode current collector 21A. The cathode current collector 21A has an end portion which is exposed because the cathode active material layer 21B is not disposed thereon in a longitudinal direction. The cathode lead 11 is attached to the exposed end portion. The cathode current collector 21A is made of, for example, metal foil such as aluminum foil, nickel foil or stainless foil.

The cathode active material layer 21B includes one kind or two or more kinds of cathode materials capable of inserting and extracting lithium as a cathode active material, and may include an electrical conductor such as a carbon material and a binder such as polyvinylidene fluoride, if necessary. Examples of the cathode materials capable of inserting and extracting lithium include metal sulfides and metal oxides not including lithium such as titanium sulfide ($TiS_2$), molybdenum sulfide ($MoS_2$), niobium selenide ($NbSe_2$) and vanadium oxide ($V_2O_5$), a complex oxide of lithium and a transition metal, and high molecular weight compounds such as polyacetylene and polypyrrole.

Among them, the complex oxide of lithium and a transition metal is preferable, because a higher voltage and a higher energy density can be obtained. As such a complex oxide, for example, a complex oxide represented by a chemical formula $Li_xMIO_2$ or $Li_yMIIPO_4$ is cited. In the formulas, MI and MII each represent one or more kinds of transition metals, and more specifically, MI and MII each preferably include at least one kind selected from the group consisting of cobalt (Co), nickel and manganese (Mn). The values of x and y depend upon charge-discharge conditions of the battery, and is generally within a range of $0.05 \leq x \leq 1.10$ and $0.05 \leq y \leq 1.10$, respectively. Specific examples of the complex oxide represented by the chemical formula $Li_xMIO_2$ include $LiCoO_2$, $LiNiO_2$, $LiNi_zCo_{1-z}O_2$ ($0<z<1$) and $LiMn_2O_4$.

The thickness of the cathode 21 including the thickness of the cathode current collector 21A is preferably 120 µm or more, because efficiency of filling a cathode active material into the battery can be improved, and a higher capacity of the battery can be achieved.

The anode 22 includes an anode current collector 22A having a pair of facing surfaces and an anode active material layer 22B disposed on one side or both sides of the anode current collector 22A. The anode current collector 22A has an end portion which is exposed because the anode active material layer 22B is not disposed in a longitudinal direction. The anode lead 12 is attached to the exposed end portion. The anode current collector 22A is made of, for example, metal foil such as copper foil, nickel foil or stainless foil.

The anode active material layer 22B include, for example, one kind or two or more kinds of anode materials capable of inserting and extracting lithium as an anode active material, and may include a binder such as polyvinylidene fluoride, if necessary. Examples of the anode materials capable of inserting and extracting lithium include carbon materials, metal oxides and high molecular weight compounds. Examples of the carbon materials include a non-graphitizable carbon material and a graphite material, and more specifically, kinds of pyrolytic carbon, kinds of coke, kinds of graphite, kinds of glass-like carbon, a sintered high molecular weight organic compound body, carbon fiber and activated carbon. Among them, kinds of coke include pitch coke, needle coke and petroleum coke, and the sintered high molecular weight organic compound is a high molecular weight compound such as a phenolic resin or a furan resin which is carbonized through sintering at an adequate temperature. Moreover, examples of the metal oxides include iron oxide, ruthemium oxide and molybdenum oxide, and examples of the high molecular weight compounds include polyacetylene and polypyrrole.

As the anode material capable of inserting and extracting lithium, a simple substance, an alloy or a compound of a metal element or a metalloid element capable of forming an alloy with lithium is cited. The alloy means not only an alloy including two or more kinds of metal elements but also an alloy including one or more kinds of metal elements and one or more kinds of metalloid elements. As the composition of the alloy, a solid solution, a eutectic (eutectic mixture), an intermetallic compound or the coexistence of two or more kinds selected from them is cited.

Examples of the metal element or the metalloid element capable of forming an alloy with lithium include magnesium (Mg), boron (B), arsenic (As), aluminum, gallium (Ga), indium (In), silicon (Si), germanium (Ge), tin (Sn), lead (Pb), antimony (Sb), bismuth (Bi), cadmium (Cd), silver (Ag), zinc (Zn), hafnium (Hf), zirconium (Zr), yttrium (Y), palladium (Pd) and platinum (Pt). As the alloy or the compound, for example, an alloy or a compound represented by a chemical formula $Ma_sMb_t$ is cited. In the chemical formula, Ma represents at least one kind selected from metal elements and metalloid elements capable of forming an alloy with lithium, and Mb represents at least one kind selected from elements except for Ma. The values of s and t are $s>0$ and $t \geq 0$, respectively.

Among them, a simple substance, an alloy or a compound of a metal element or a metalloid element of Group 14 in the long form of the periodic table of the elements is preferable, and silicon or tin, or an alloy thereof or a compound thereof is more preferable. They may have a crystalline structure or an amorphous structure.

Examples of such an alloy or such a compound include LiAl, AlSb, CuMgSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$), $SnSiO_3$, LiSiO and LiSnO.

The thickness of the anode 22 including the thickness of the anode current collector 22A is preferably 105 μm or more, because efficiency of filling an anode active material into the battery can be improved, and a higher capacity of the battery can be achieved.

The separator 23 is made of, for example, a porous film of a synthetic resin such as polytetrafluoroethylene, polypropylene or polyethylene, or a porous film of ceramic, and the separator 23 may have a structure in which two or more kinds of the porous films are laminated.

The electrolyte 24 includes, for example, a high molecular weight compound and an electrolyte solution prepared by dissolving an electrolyte salt in a solvent, and the electrolyte solution is held in the high molecular weight compound to gelate the electrolyte solution. As will be described later, the electrolyte 24 is formed, for example, through applying a coating solution prepared by dissolving the high molecular weight compound in a mixed solvent to at least either the cathode 21 or the anode 22.

The high molecular weight compound includes a first high molecular weight compound with a weight-average molecular weight of 550,000 or more and a second high molecular weight compound with a weight-average molecular weight of 1,000 or more but not exceeding 300,000. The first high molecular weight compound is provided to enhance adhesion between the electrolyte 24, the cathode 21 and the anode 22. The adhesion strength to the cathode 21 and the anode 22 is gradually improved with an increase in the weight-average molecular weight from a weight-average molecular weight of approximately 300,000; however, when the weight-average molecular weight of the high molecular weight compound is less than 550,000, sufficient adhesion strength cannot be obtained. On the other hand, the second high molecular weight compound is provided to enhance permeability of the electrolyte 24 into the cathode 21 and the anode 22. When only the first high molecular weight compound is included, the viscosity of the electrolyte 24 becomes too large, so the permeability into the cathode 21 and the anode 22 becomes lower. Therefore, when the cathode 21 and the anode 22 have a large thickness, it is difficult to permeate the electrolyte 24 into the neighborhood of the cathode current collector 21A and the anode current corrector 22A. In other words, in the embodiment, while the first high molecular weight compound enhances adhesion of the electrolyte 24 to the cathode 21 and the anode 22, the second high molecular weight compound enhances the permeability of the electrolyte 24 into the cathode 21 and the anode 22.

The ratio of the first high molecular weight compound in the electrolyte 24 is preferably 30% by weight or more. When the ratio of the first high molecular weight compound is too small, sufficient adhesion strength cannot be obtained. Moreover, the first high molecular weight compound preferably has a weight-average molecular weight of 3,000,000 or less. It is considered that the larger the weight-average molecular weight is, the more the adhesion strength will be improved; however, when the weight-average molecular weight is larger than 3,000,000, the viscosity becomes larger, so when the high molecular weight compound is dissolved in the mixed solvent, it is required to reduce the ratio of the high molecular weight compound to an unrealistic dilution rate. Moreover, the weight-average molecular weight of the first high molecular weight compound is preferably 1,000,000 or less. When the weight-average molecular weight of the first high molecular weight compound is larger than 1,000,000, kinds of solvents or mixed solvents with compatibility are limited.

The high molecular weight compound preferably include a third high molecular weight compound with a weight-average molecular weight of 300,000 or more but not exceeding 550,000 in addition to the first high molecular weight compound and the second high molecular weight compound. In a step of forming the electrolyte 24, the viscosity of the coating solution prepared by dissolving the high molecular weight compound can be reduced so as to easily apply the coating solution. Also in this case, as described above, the ratio of the first high molecular weight compound in the electrolyte 24 is preferably 30% by weight or more.

Although the functions of the first high molecular weight compound, the second high molecular weight compound and the third high molecular weight compound are described above, in a high molecular weight compound having a weight-average molecular weight near a boundary between the first, the second and the third high molecular weight compounds, a difference between clear functions thereof becomes small, and there may be a high molecular weight compound combining two functions.

As the first high molecular weight compound, the second high molecular weight compound and the third high molecular weight compound, for example, polyvinylidene fluoride and a copolymer of polyvinylidene fluoride can be used, and as a monomer of the copolymer, hexafluoropropylene or tetrafluoroethylene is cited. Polyvinylidene fluoride and a copolymer thereof are preferable, because high battery characteristics can be obtained, and among them, a block copolymer of vinylidene fluoride and hexafluoropropylene is more preferable.

It is because when a copolymer of vinylidene fluoride and hexafluoropropylene is prepared so as to have a molecular weight equivalent to that of polyvinylidene fluoride with a melting point of 175° C., in a block copolymer, properties of each monomer are more independently exhibited, and in a random copolymer, crystallinity exhibited by vinylidene fluoride and flexibility exhibited by hexafluoropropylene are simply combined. For example, in the block copolymer, the crystallinity of a crystal part by vinylidene fluoride is not substantially impaired, and the block copolymer has a more intermediate melting point of approximately 150° C., and flexibility exhibited by hexafluoropropylene is secured. On the other hand, in the random copolymer, the melting point of the random copolymer is 130° C. to 140° C. as in the case where crystallinity simply declines, and the capability of holding a solvent is improved only by an effect produced by reduced crystallinity. Therefore, in the random copolymer, when the ratio of hexafluoropropylene is larger, for example, 8% by weight or more so as to hold a large amount of the solvent, the film strength substantially declines, thereby the electrolyte 24 is solated. On the other hand, the block copolymer has strength by the crystal part and flexibility by hexafluoropropylene, so even though the ratio of hexafluoropropylene is not so large, a large amount of the solvent can be held.

The ratio of hexafluoropropylene in the block copolymer of vinylidene fluoride and hexafluoropropylene is preferably within a range of 3% by weight to 7.5% by weight inclusive. When the ratio of hexafluoropropylene is larger than the range, the film strength may be insufficient, and when the ratio is less than 3% by weight, the solvent may not be held sufficiently. Moreover, the ratio of the high molecular weight compound in the electrolyte 24 is preferably within a range of 2% by weight to 20% by weight inclusive. When the ratio of the high molecular weight compound is too small, it is difficult to hold an electrolyte solution, and when the ratio is too large, ionic conductivity declines.

Examples of the solvent include cyclic carbonates such as propylene carbonate, ethylene carbonate and butylene carbonate, acyclic carbonates such as dimethyl carbonate, diethyl carbonate and ethyl methyl carbonate, ethers such as γ-butyrolactone, sulfolane, 2-methyltetrahydrofuran and dimethoxyethane. As the solvent, one kind or a mixture of two or more kinds selected from them may be used.

Examples of the electrolyte salt include lithium chloride (LiCl), lithium bromide (LiBr), lithium iodide (LiI), lithium chlorate ($LiClO_3$), lithium perchlorate ($LiClO_4$), lithium bromate ($LiBrO_3$), lithium iodate ($LiIO_3$), lithium nitrate ($LiNO_3$), lithium tetrafluoroborate ($LiBF_4$), lithium hexafluorophosphate ($LiPF_6$), lithium acetate ($LiCH_3COO$), lithium bis(trifluoromethanesulfonyl)imide ($LiN(SO_2CF_3)_2$), lithium hexafluoroarsenate ($LiAsF_6$), lithium trifluoromethane sulfonate ($LiCF_3SO_3$), lithium tris(trifluoromethanesulfonyl)methyl ($LiC(SO_2CF_3)_3$), lithium tetrachloroaluminate ($LiAlCl_4$), and lithium hexafluorosilicate ($LiSiF_6$). Among them, in terms of oxidation stability, $LiPF_6$ or $LiBF_4$ is preferably used. As the electrolyte salt, one kind or a mixture of two or more kinds selected from them may be used.

The concentration of the electrolyte salt in the solvent is preferably within a range of 0.1 $mol/dm^3$ to 3.0 $mol/dm^3$, and more preferably 0.5 $mol/dm^3$ to 2.0 $mol/dm^3$. Moreover, the ratio of the electrolyte solution in the electrolyte 24 is preferably 80% by weight or more. When the ratio of the electrolyte solution is too small, the mobility of lithium ions involved in conduction is reduced, which is not preferable.

When the secondary battery is charged, for example, lithium ions are extracted from the cathode active material layer 21B, and are inserted into the anode active material layer 22B through the electrolyte 24. When the secondary battery is discharged, for example, lithium ions are extracted from the anode active material layer 22B, and are inserted into the cathode active material layer 21B through the electrolyte 24. Herein, the electrolyte 24 includes the first high molecular weight compound and the second high molecular weight compound, so the adhesion strength of the electrolyte 24 to the cathode 21 and the anode 22 and the permeability of the electrolyte 24 into the cathode 21 and the anode 22 are improved, and the electrolyte 24 comes into contact with the cathode 21 and the anode 22 in an electrically good condition, so superior charge-discharge cycle characteristics can be obtained. Further, the mechanical strength of the electrolyte 24 is improved, and the solvent is sufficiently held in the electrolyte 24, so superior load characteristics and superior low temperature characteristics can be obtained.

The secondary battery with such a structure can be manufactured through the following steps, for example.

At first, a cathode active material and a binder, and, if necessary, an electrical conductor are mixed to prepare a cathode mixture, and the cathode mixture is dispersed in a solvent such as methyl-2-pyrrolidone to form cathode mixture slurry. Next, after the cathode mixture slurry is applied to one side or both sides of the cathode current collector 21A, and is dried, the cathode active material layer 21B is formed through compression molding so as to form the cathode 21.

Moreover, for example, an anode active material and a binder are mixed to prepare an anode mixture, and the anode mixture is dispersed in a solvent such as N-methyl-2-pyrrolidone to form anode mixture slurry. Next, after the anode mixture slurry is applied to one side or both sides of the anode current collector 22A, and is dried, the anode active material layer 22B is formed through compression molding so as to form the anode 22.

Moreover, monomers are prepared, and they are polymerized under a pressure of 300 atmospheres or less at a temperature ranging from room temperature to 200° C. through suspension polymerization or emulsion polymerization to form the first high molecular weight compound and the second high molecular weight compound. More specifically, when they are formed through suspension polymerization, at first, monomers as droplets are dispersed in a medium by a dispersant, and a polymerization initiator is added to the medium, and the medium is stirred. Then, the temperature is increased to a predetermined temperature to start a polymerization reaction.

At this time, as the medium, for example, water can be used. Moreover, as the dispersant, partly saponified polyvinyl acetate, tetrasodium pyrophosphate, water-soluble cellulose ether such as methyl cellulose, hydroxyethyl cellulose, hydroxypropyl cellulose or hydroxypropyl methyl cellulose, a water-soluble polymer such as acrylic polymer or gelatin can be used. As the dispersant, one kind or a mixture of two or more kinds selected from them may be used. Moreover, as the polymerization initiator, for example, di-N-propyl peroxydicarbonate or diisopropyl peroxydicarbonate can be used. As the polymerization initiator, one kind or a mixture of two or more kinds selected from them may be used.

Next, after a lapse of a predetermined time from the start of the polymerization reaction, a chain transfer agent and any other auxiliary agent are added to continue the polymerization reaction, thereby polymer slurry is obtained. Next, after water is removed from the polymer slurry, the polymer slurry is rinsed in water, and then is dried.

At this time, as the chain transfer agent, acetone, isopropyl acetate, ethyl acetate, diethyl carbonate, dimethyl carbonate, ethyl pyrocarbonate, propionic acid, trifluoroacetic acid, trifluoroethyl alcohol, formaldehyde dimethyl acetal, 1,3-butadiene epoxide, 1,4-dioxane, β-butyrolactone, ethylene carbonate or vinylene carbonate can be used, and in terms of availability and ease of handling, acetone or ethyl acetate is preferable. As the chain transfer agent, one kind or a mixture of two or more kinds selected from them may be used.

In the above steps, the timing of adding monomers or the chain transfer agent, a reaction temperature, reaction pressure, reaction time and the like are controlled so that the molecular weight or the composition of a high molecular weight compound to be formed can be controlled.

After the first high molecular weight compound and the second high molecular weight compound are formed, the high molecular weight compounds, an electrolyte solution and a mixed solvent such as dimethyl carbonate are mixed on heating to form a coating solution. Next, the cathode lead 11 is attached to the cathode current collector 21A, and the formed coating solution is applied to the cathode active material layer 21B to permeate the cathode active material layer 21B with the coating solution. Then, the mixed solvent is volatilized to form the electrolyte 24. Moreover, the anode lead 12 is attached to the anode current collector 22A, and the formed coating solution is applied to the anode active material layer 22B to permeate the anode active material layer 22B with the coating solution. Then, the mixed solvent is volatilized to form the electrolyte 24. The electrolyte 24 is not necessarily formed on both of the cathode 21 and the anode 22, and may be formed on either the cathode 21 or the anode 22.

Next, the cathode 21 with the electrolyte 24 formed thereon and the anode 22 with the electrolyte 24 formed thereon are laminated with the separator 23 in between, and the laminate is spirally wound. Then, the protective tape 25 is bonded to an outermost portion of the laminate so as to form the battery element 20.

Finally, for example, the battery element 20 is interposed in the package member 30, and then edge portions of the package member 20 are bonded together by heat fusion bonding or the like to seal the package member 30. At this time, the adhesive film 31 is inserted each between the cathode lead 11 and the package member 30 and between the anode lead 12 and the package member 30. Thereby, the secondary battery shown in FIGS. 1 and 2 is completed.

Thus, in the embodiment, the electrolyte 24 includes the first high molecular weight compound and the second high molecular weight compound, so the adhesion strength of the electrolyte 24 to the cathode 21 and the anode 22 and the permeability of the electrolyte 24 into the cathode 21 and the anode 22 can be improved, and the electrolyte 24 can come into contact with the cathode 21 and the anode 22 in an electrically good condition. Therefore, superior charge-discharge cycle characteristics can be obtained. Moreover, the mechanical strength of the electrolyte 24 can be improved, and the electrolyte 24 can sufficiently hold the solvent, so superior load characteristics and low temperature characteristics can be obtained.

Specifically, when the third high molecular weight compound is included in addition to the first high molecular weight compound and the second high molecular weight compound, manufacturing can be easily performed without a decline in characteristics.

[Second Embodiment]

A secondary battery according to a second embodiment of the invention has the same structure, the same functions and the same effects as those in the first embodiment, except that the composition of an electrolyte is different. Therefore, in the second embodiment, FIG. 1 is referred, and like components will not be further described.

The electrolyte 24 includes, for example, a high molecular weight compound and an electrolyte salt dispersed in the high molecular weight compound and dissociated, and the electrolyte 24 is solid. The high molecular weight compound is the same as that in the first embodiment, and includes the first high molecular weight compound and the second high molecular weight compound. Moreover, the kind of the electrolyte salt is the same as that in the first embodiment.

The secondary battery can be manufactured as in the case of the first embodiment, except that, for example, the first high molecular weight compound, the second high molecular weight compound, the electrolyte salt and a mixed solvent such as dimethyl carbonate are mixed on heating to form a coating solution, and the coating solution is applied to at least either the cathode 21 or the anode 22 to permeate the cathode 21 or the anode 22 with the coating solution, thereby the electrolyte 24 is formed.

EXAMPLES

Moreover, specific examples of the invention will be described below.

As Examples 1 through 6 and Comparative Examples 1 through 5, secondary batteries described in the embodiments were formed. At first, lithium carbonate ($Li_2CO_3$) and cobalt carbonate ($CoCO_3$) were mixed at a ratio of 0.5 mol:1 mol to form a mixture, and the mixture was fired for 5 hours at 900° C. in air to obtain lithium cobalt oxide ($LiCoO_2$). Next, 91 parts by weight of the obtained lithium cobalt oxide as a cathode active material, 6 parts by weight of graphite as an electrical conductor and 10 parts by weight of a copolymer of vinylidene fluoride and hexafluoropropylene as a binder were mixed to prepare a cathode mixture. Next, the cathode mixture was dispersed in N-methyl-2-pyrrolidone as a solvent to form cathode mixture slurry. Then, after the cathode mixture slurry was uniformly applied to the cathode current collector 21A made of strip-shaped aluminum foil with a thickness of 20 μm, and was dried, the cathode active material layer 21B was formed through compression molding by a roller press so as to form the cathode 21. At that time, the cathode 21 had a thickness of 120 μm.

Moreover, graphite was pulverized to form a graphite powder, and 90 parts by weight of the graphite powder as an anode active material and 10 parts by weight of a copolymer of vinylidene fluoride and hexafluoropropylene as a binder were mixed to prepare an anode mixture. Next, the anode mixture was dispersed in N-methyl-2-pyrrolidone as a solvent to form anode mixture slurry. Next, after the anode mixture slurry was uniformly applied to the anode current collector 22A made of strip-shaped copper foil with a thickness of 10 μm, and was dried, the anode active material layer 22B was formed through compression molding by a roller press so as to form the anode 22. At that time, the anode 22 had a thickness of 105 μm.

Moreover, block copolymers of vinylidene fluoride and hexafluoropropylene with a weight-average molecular weight of approximately 50,000, approximately 100,000, approximately 150,000, approximately 200,000, approximately 300,000, approximately 350,000, approximately 400,000 and approximately 700,000 were formed. More specifically, at first, 93 parts by weight of vinylidene fluoride and 7 parts by weight of hexafluoropropylene as monomers, 300 parts by weight of pure water, 0.1 parts by weight of methyl cellulose and 0.2 parts by weight of tetrasodium pyrophosphate as dispersants, and 0.61 parts by weight of di-N-propyl peroxydicarbonate as a polymerization initiator were put in a pressure-tight autoclave made of stainless with a volumetric capacity of 14 $dm^3$, and a polymerization reaction started at 25° C. After the lapse of 3 to 24 hours after the start of the polymerization (at a polymerization inversion rate of 30 to 80%), 3.0 parts by weight of ethyl acetate as a chain transfer agent was added to continue the polymerization reaction. When the pressure in the pressure-tight autoclave declined by 50% of an equilibrium pressure after the start of the polymerization, an unreacted monomer was removed, and after water was removed from the obtained polymer slurry, the polymer slurry was rinsed in water and was dried so as to obtain a copolymer powder of vinylidene fluoride and hexafluoropropylene.

The melting point of the obtained copolymer powder was determined through the following steps. The temperature of the copolymer powder increased from 30° C. at a rate of 10° C./min. in a nitrogen atmosphere by using a DSC (Differential Scanning Calorimeter; produced by Mettler; TA10A) to determine a DSC curve. The temperature at the point where the endothermic peak by the melting of a copolymer crystal was at the maximum was determined from the DSC curve as the melting point of the copolymer. As a result, the melting point was approximately an intermediate value between the melting point of vinylidene fluoride and the melting point of hexafluoropropylene. Therefore, it was confirmed that the obtained copolymer was a block copolymer.

Moreover, the obtained copolymer powder was dissolved in dimethylacetamide at a concentration of 0.2% by weight, and the weight-average molecular weight of the copolymer powder was determined by using a gel permeation chromatograph (Produced by Tosoh; 8010 series) using two TSK-GELGMHXL columns with a diameter of 7.8 mm and a length of 300 mm connected in series at 40° C. and a flow rate of 0.8 ml/min.

Further, the composition analysis of the obtained copolymer powder was performed by using 19FNMR. As a result, it was found out that the content of hexafluoropropylene in the copolymer powder was 7.0% by weight.

Next, 10 parts by weight of the formed copolymer powder and 60 parts by weight of dimethyl carbonate as a mixed solvent were mixed with and dissolved in 30 parts by weight of a solvent including 42.5 parts by weight of ethylene carbonate, 42.5 parts by weight of propylene carbonate and 15 parts by weight of $LiPF_6$, so as to form a coating solution.

At that time, in Example 1, copolymer powders with a weight-average molecular weight of approximately 700,000, approximately 400,000 and approximately 50,000 blended at a weight ratio of 8:1:1 were used, and in Example 2, copolymer powders with a weight-average molecular weight of approximately 700,000, approximately 400,000 and approximately 100,000 blended at a weight ratio of 8:1:1 were used, and in Example 3, copolymer powders with a weight-average molecular weight of approximately 700,000, approximately 400,000 and approximately 150,000 blended at a weight ratio of 8:1:1 were used, and in Example 4, copolymer powders with a weight-average molecular weight of approximately 700,000, approximately 400,000 and approximately 200,000 blended at a weight ratio of 8:1:1 were used, and in Example 5, copolymer powders with a weight-average molecular weight of approximately 700,000, approximately 400,000 and approximately 250,000 blended at a weight ratio of 8:1:1 were used, and in Example 6, copolymer powders with a weight-average molecular weight of approximately 700,000 and approximately 50,000 blended at a weight ratio of 9:1 were used. Moreover, in Comparative Example 1, copolymer powders with a weight-average molecular weight of approximately 700,000, approximately 400,000 and approximately 300,000 blended at a weight ratio of 8:1:1 were used, and in Comparative Example 2, copolymer powders with a weight-average molecular weight of approximately 700,000, approximately 400,000 and approximately 350,000 blended at a weight ratio of 8:1:1 were used, and in Comparative Example 3, copolymer powders with a weight-average molecular weight of approximately 700,000 and approximately 400,000 blended at a weight ratio of 9:1, and in Comparative Example 4, copolymer powders with a weight-average molecular weight of approximately 400,000 and approximately 50,000 blended at a weight ratio of 9:1 were used, and in Comparative Example 5, a copolymer powder with a weight-average molecular weight of approximately 200,000 was used.

Next, the cathode lead 11 was attached to the cathode current collector 21A, and the formed coating solution was uniformly applied to the cathode active material layer 21B to permeate the cathode active material layer 21B with the coating solution, then the cathode active material layer 21B was left standing at room temperature for 8 hours to volatilize dimethyl carbonate, thereby the electrolyte 24 was formed. Moreover, the anode lead 12 was attached to the anode current collector 22A, and the formed coating solution was uniformly applied to the anode active material layer 22B to permeate the cathode active material layer 22B with the coating solution, then the anode active material layer 22B was left standing at room temperature for 8 hours to volatilize dimethyl carbonate, thereby the electrolyte 24 was formed. The total thickness of the electrolytes 24 on the cathode 21 and the anode 22 was 25 µm. In addition, the thickness of the electrolyte 24 was equal to a distance between the cathode 21 and the anode 22 bonded together with the electrolyte 24 in between.

Next, after the cathode 21 and the anode 22 were laminated, the laminate is spirally wound in a longitudinal direction to be compression bonded, thereby the battery element 20 with a major diameter of 34 mm was formed. After that, the battery element 20 was contained in the package member 30 made of a laminate film with three-layer structure including polypropylene, aluminum and nylon, and the package member 30 was vacuum sealed. The secondary batteries shown in FIGS. 1 and 2 were obtained through the above steps.

The peel strength of the electrolyte 24 in each secondary battery of Examples 1 through 6 and Comparative Examples 1 through 5 was measured, and the charge-discharge cycle characteristics, the incidence of short circuits, the load characteristics, and the low temperature characteristics of each secondary battery were evaluated. The results are shown in Table 1.

TABLE 1

| | WEIGHT-AVERAGE MOLECULAR WEIGHT OF HIGH MOLECULAR WEIGHT COMPOUND | PEEL STRENGTH | CYCLE CHARACTER-ISTICS (%) | NUMBER OF INCIDENCE OF SHORT CIRCUITS (OUT OF 100) | LOAD CHARACTERISTICS (%) | | | LOW TEMPERATURE CHARACTERISTICS (%) | | |
|---|---|---|---|---|---|---|---|---|---|---|
| | | | | | 1C | 2C | 3C | 0° C. | −10° C. | −20° C. |
| EXAMPLE 1 | APPROX. 700,000 APPROX. 400,000 APPROX. 50,000 | ○ | 95 | 0 | 99 | 99 | 99 | 91 | 78 | 60 |
| EXAMPLE 2 | APPROX. 700,000 APPROX. 400,000 APPROX. 100,000 | ○ | 95 | 0 | 99 | 99 | 99 | 91 | 78 | 60 |
| EXAMPLE 3 | APPROX. 700,000 APPROX. 400,000 APPROX. 150,000 | ○ | 95 | 0 | 99 | 99 | 99 | 91 | 78 | 60 |
| EXAMPLE 4 | APPROX. 700,000 APPROX. 400,000 APPROX. 200,000 | ○ | 90 | 0 | 99 | 95 | 93 | 87 | 75 | 55 |
| EXAMPLE 5 | APPROX. 700,000 APPROX. 400,000 APPROX. 250,000 | ○ | 87 | 0 | 95 | 90 | 85 | 82 | 70 | 50 |
| EXAMPLE 6 | APPROX. 700,000 APPROX. 50,000 | ○ | 95 | 0 | 99 | 99 | 99 | 91 | 78 | 60 |
| COMPARATIVE EXAMPLE 1 | APPROX. 700,000 APPROX. 400,000 APPROX. 300,000 | ○ | 83 | 0 | 91 | 82 | 80 | 77 | 65 | 45 |
| COMPARATIVE EXAMPLE 2 | APPROX. 700,000 APPROX. 400,000 APPROX. 350,000 | ○ | 79 | 0 | 83 | 80 | 72 | 72 | 60 | 40 |
| COMPARATIVE EXAMPLE 3 | APPROX. 700,000 APPROX. 400,000 | ○ | 75 | 0 | 70 | 50 | 65 | 69 | 56 | 38 |
| COMPARATIVE EXAMPLE 4 | APPROX. 400,000 APPROX. 50,000 | Δ | 60 | 40 | 52 | 45 | 40 | 50 | 40 | 25 |
| COMPARATIVE EXAMPLE 5 | APPROX. 200,000 | X | 30 | 80 | 45 | 25 | 10 | 40 | 28 | 15 |

Figure 3:
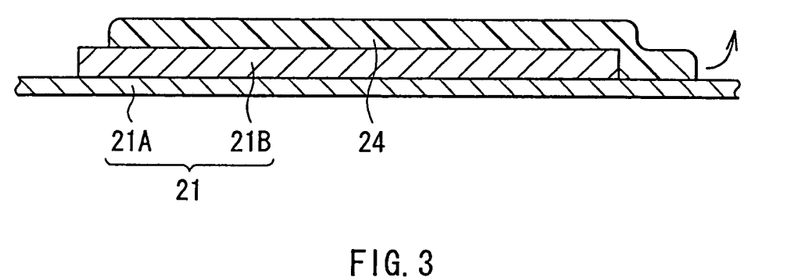
FIG. 3 is a sectional view showing a test method for measuring peel strength used in examples of the invention.

As shown in FIG. 3, the peel strength was evaluated through forming the electrolyte 24 according to the embodiments on the cathode 21 according to the embodiment, and pulling the electrolyte 24 in a direction of an arrow (a direction of 180°) with a load of 500 g at a rate of approximately 10 cm/sec. In the method, the case where the electrolyte 24 was broken was indicated with ○, and the case where the electrolyte 24 was not broken, but the electrolyte 24 and the cathode active material layer 21B were not fully peeled from a boundary was indicated with Δ, and the case where the electrolyte 24 and the cathode active material layer 21B were peeled from the boundary was indicated with X.

Moreover, the charge-discharge characteristics of each battery were determined through the following steps. The battery was charged with a constant current and a constant voltage at a current value of 1 C and 23° C. to an upper limit of 4.2 V, and then the battery was discharged with a constant current at a 2-hour rate discharge (0.5 C) of a theoretical capacity to a cutoff voltage of 3.2 V. The above cycle of charge and discharge was repeated 500 times to determine the charge-discharge characteristics as (discharge capacity in the 500th cycle)/(discharge capacity in the first cycle)× 100.

Further, the incidence of short circuits in each battery was evaluated as the number of the occurrence of short circuits after 500 cycles of charge and discharge under the above-described conditions. The number of the measured batteries was 100.

In addition, the load characteristics of each battery were determined through the following steps. The battery was charged with a constant current and a constant voltage at a current value of 1 C and 23° C. to an upper current limit of 4.2 V, and then the battery was discharged with a constant current at a 1-hour rate discharge (1 C), a ½-hour rate discharge (2 C), and a ⅓-hour rate discharge (3 C) of a theoretical capacity to a cutoff voltage of 3.2 V. Then, an output at each hour rate discharge as a percentage of an output at 0.5 C was calculated from an average voltage determined by the charge and the discharge.

Further, the low temperature characteristics of each battery were determined through the following steps. The battery was charged with a constant current and a constant voltage at a current value of 1 C under each temperature of 0° C., −10° C. and −20° C. to an upper limit of 4.2 V, and then the battery was discharged with a constant current at a 2-hour rate discharge (½C) of a theoretical capacity to a cutoff voltage of 3.2 V. Then, an output at a 2-hour rate discharge under each temperature as a percentage of an output when the battery was discharged under room temperature was calculated from an average voltage determined by the charge and the discharge.

It was obvious from Table 1 that in Examples 1 through 6 in which the first high molecular weight compound and the second high molecular weight compound were used, higher values in the charge-discharge cycle characteristics, the load characteristics and the low temperature characteristics were obtained, compared to Comparative Examples 1 through 3 in which the first high molecular weight compound and the third high molecular weight compound were used, Comparative Example 4 in which the second high molecular weight compound and the third high molecular weight compound were used, and Comparative Example 5 in which only the second high molecular weight compound was used. Moreover, in Examples 1 through 6, the peel strength was higher, and no short circuit occurred. On the other hand, in Comparative Examples 4 and 5, the peel strength was lower, and a short circuit occurred.

In other words, it was found out that when the electrolyte 24 included the first high molecular weight compound and the second high molecular weight compound, not only the peel strength and the charge-discharge cycle characteristics but also the load characteristics and the low temperature characteristics could be improved, and the occurrence of a short circuit could be prevented.

The present invention is described referring to the embodiments and the examples, but the invention is not limited to the above embodiments and the examples, and is variously modified. For example, in the embodiments and the examples, the high molecular weight compound is described referring to specific examples; however, any other high molecular weight compound may be used. As the high molecular weight compound, a copolymer of vinylidene fluoride, hexafluoropropylene and chlorotrifluoroethylene, polyacrylonitrile, polyethylene oxide or polymethyl methacrylate is cited.

Moreover, in the above embodiments and the above examples, the cathode 21 and the anode 22 are laminated, and then is spirally wound; however, after the cathode and the anode are laminated, they may be fanfolded, or a plurality of cathodes and a plurality of anodes may be alternately laminated. Moreover, the invention may be applied to a secondary battery with any other shape such as a cylindrical shape, a prismatic shape, a coin shape or a button shape, and the size of the secondary battery is not specifically limited, and the invention may be applied to a secondary battery with any other size such as a large size or a low-profile size. Further, the invention can be applied to not only secondary batteries but also primary batteries.

Obviously many modifications and variations of the present invention are possible in the light of the above teachings. It is therefore to be understood that within the scope of the appended claims the invention may be practiced otherwise than as specifically described.

What is claimed is:

1. An electrolyte, applied on a cathode or an anode of a battery, said electrolyte comprising:
   a first high molecular weight compound with a weight-average molecular weight of more than 550,000 and less than 1,000,000;
   a second high molecular weight compound with a weight-average molecular weight of 1,000 or more and equal to or less than approximately 150,000; and
   a third high molecular weight compound with a weight-average molecular weight of more than 300,000 but less than 550,000,
   wherein each of the first, second and third high molecular weight compounds is a block copolymer of vinylidene fluoride and hexafluoropropylene having a melting point of approximately 150° C.; and
   wherein the first high molecular weight compound has a weight percentage of the electrolyte of 30% or more, and further wherein there is a difference of approximately 200,000-300,000 weight-average molecular weight between the first and third high molecular weight compounds and of approximately 150,000-350,000 weight-average molecular weight between the second and third high molecular weight compounds.

2. The electrolyte according to claim 1, wherein
   a ratio of hexafluoropropylene in the block copolymer is within a range of 3% by weight to 7.5% by weight inclusive.

3. The electrolyte according to claim 1, further comprising:
   an electrolyte solution prepared by dissolving an electrolyte salt in a solvent, wherein the ratio of the electrolyte solution is 80% by weight or more.

4. A battery, comprising:
   a cathode;
   an anode; and
   an electrolyte,
   wherein the cathode comprises a cathode active material layer and a cathode current collector;
   wherein the electrolyte is applied on the cathode or the anode, said electrolyte comprising:
   a first high molecular weight compound with a weight-average molecular weight of more than 550,000 and less than 1,000,000;
   a second high molecular weight compound with a weight-average molecular weight of 1,000 or more and equal to or less than approximately 150,000; and
   a third high molecular weight compound with a weight-average molecular weight of more than 300,000 but less than 550,000,
   wherein each of the first, second and third high molecular weight compounds is a block copolymer of vinylidene fluoride and hexafluoropropylene having a melting point of approximately 150° C.;
   wherein the first high molecular weight compound has a weight percentage of the electrolyte of 30% or more, and wherein the cathode active material layer that is comprised of a complex oxide of lithium and a transition metal, and a thickness of the cathode including a thickness of the cathode current collector is 120 µm or more and further wherein there is a difference of approximately 200,000-300,000 weight-average molecular weight between the first and third high molecular weight compounds and of approximately 150,000-350,000 weight-average molecular weight between the second and third high molecular weight compounds.

5. The battery according to claim 4, wherein
   a ratio of hexafluoropropylene in the block copolymer is within a range of 3% by weight to 7.5% by weight inclusive.

6. The battery according to claim 4, further comprising:
   an electrolyte solution prepared by dissolving an electrolyte salt in a solvent, wherein a ratio of the electrolyte solution is 80% by weight or more.

7. The battery according to claim 4, wherein
   the electrolyte is formed through applying a coating solution including the first, second and third high molecular weight compounds to at least either the cathode or the anode.

8. The electrolyte according to claim 1, wherein said electrolyte contains no other high molecular weight compounds.

9. The battery according to claim 4, wherein said electrolyte contains no other high molecular weight compounds.

10. The battery according to claim 4, wherein a thickness of the anode including a thickness of an anode current collector is 105 µm or more.

11. The battery according to claim 4, wherein the anode including an anode active material layer which comprises at least one element selected from a group of carbon (C), magnesium (Mg), boron (B), arsenic (As), aluminum (Al), gallium (Ga), indium (In), silicon (Si), germanium (Ge), tin (Sn), lead (Pb), antimony (Sb), bismuth (Bi), cadmium (Cd), Silver (Ag), zinc (Zn), Hafnium (Hf), zirconium (Zr), yttrium (Y), palladium (Pd) and platinum (Pt).

* * * * *